(12) United States Patent
Huang

(10) Patent No.: US 7,551,357 B2
(45) Date of Patent: Jun. 23, 2009

(54) APPARATUS FOR ASSEMBLING LENS MODULE

(75) Inventor: Chien-Feng Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/102,606

(22) Filed: Apr. 14, 2008

(65) Prior Publication Data

US 2008/0291558 A1 Nov. 27, 2008

(30) Foreign Application Priority Data

May 23, 2007 (CN) .................. 2007 1 0200686

(51) Int. Cl.
*G02B 27/10* (2006.01)
*B65B 3/04* (2006.01)
*B65G 1/133* (2006.01)

(52) U.S. Cl. .................. 359/619; 53/473; 53/235; 53/246; 53/247; 414/752.1; 65/246; 451/5; 451/11; 206/445

(58) Field of Classification Search .......... 359/811, 359/813, 819, 619; 414/737, 752.1, 755; 206/5, 5.1, 445, 454, 486, 459.1, 562; 53/246, 53/251, 254, 473; 451/5, 10, 11; 29/832, 29/833, 840; 65/227, 246, 260; 269/43, 269/45, 291, 303; 134/58 R, 59
See application file for complete search history.

(56) References Cited

U.S. PATENT DOCUMENTS

| | | | | |
|---|---|---|---|---|
| 4,187,051 A | * | 2/1980 | Kirsch et al. | 414/744.3 |
| 5,509,191 A | * | 4/1996 | Best | 29/722 |
| 5,561,970 A | * | 10/1996 | Edie et al. | 53/473 |
| 5,836,323 A | * | 11/1998 | Keene et al. | 134/58 R |
| 5,996,792 A | * | 12/1999 | Alvaro et al. | 206/454 |
| 6,071,112 A | * | 6/2000 | Calvin et al. | 425/445 |
| 6,305,729 B1 | * | 10/2001 | Mukasa | 294/64.1 |
| 6,913,510 B2 | * | 7/2005 | Mizuno et al. | 451/5 |
| 7,185,424 B2 | * | 3/2007 | Mitsumoto et al. | 29/833 |
| 7,371,151 B2 | * | 5/2008 | Shibata et al. | 451/11 |
| 7,380,417 B2 | * | 6/2008 | Wang | 65/246 |
| 7,380,418 B2 | * | 6/2008 | Wang | 65/246 |

* cited by examiner

*Primary Examiner*—Loha Ben
(74) *Attorney, Agent, or Firm*—Andrew C. Cheng

(57) ABSTRACT

An apparatus for assembling lens module (10) includes a firs tray (122), a second tray (142), and a robotic arm (16) with an optical element pick-up device (18). The first tray is configured for supporting a plurality of barrels thereon. The second tray is configured for supporting a plurality of optical elements thereon. The robotic arm with an optical element pick-up device is configured for picking up the optical elements from the second tray and assembling the optical elements into the barrels. The optical element pick-up device includes a plurality of suction mouths configured for picking up the plurality of optical elements at the same time.

11 Claims, 7 Drawing Sheets

APPARATUS FOR ASSEMBLING LENS MODULE

BACKGROUND

1. Field of the Invention

The present invention relates to apparatuses for assembling lens modules.

2. Description of Related Art

Automatic lens system assembly operations are well known. Automatic assembly of the lens system doesn't not require a large number of operators.

Generally, a typical apparatus 30 for assembling lens module, referring to FIG. 7, is a linear cylinder apparatus. The apparatus 30 includes a pneumatic cylinder 32, and a rod 34. One end of the rod 34 is connected to the pneumatic cylinder 32 and can slide therein. The other end of the rod 34 includes a suction mouth 36. In operation, the suction mouth 36 secures a lens 38, and then the pneumatic cylinder 32 pushes the lens 38 into a barrel 40 through the rod 34. The cylinder 32, the rod 34, and the barrel 40 are generally aligned so that the lens 38 can be linearly assembled into the barrel 40.

However, only one lens 38 can be assembled into the barrel 40 at a time. As a result, the yield of the lens modules is not high enough.

Therefore, what is needed is an apparatus for assembling lens module with high and stable yield.

SUMMARY OF THE INVENTION

An apparatus for assembling lens module according a present embodiment includes a first tray, a second tray, and a robotic arm with an optical element pick-up device. The first tray is configured for supporting a plurality of barrels thereon. The second tray is configured for supporting a plurality of optical elements thereon. The robotic arm with an optical element pick-up device is configured for picking up the optical elements from the second tray and assembling the optical elements into the barrels. The optical element pick-up device includes a plurality of suction mouths configured for picking up the plurality of optical elements at the same time.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Reference will now be made to the drawings to describe in detail the preferred embodiments of the present apparatus for assembling lens module.

Figure 1:
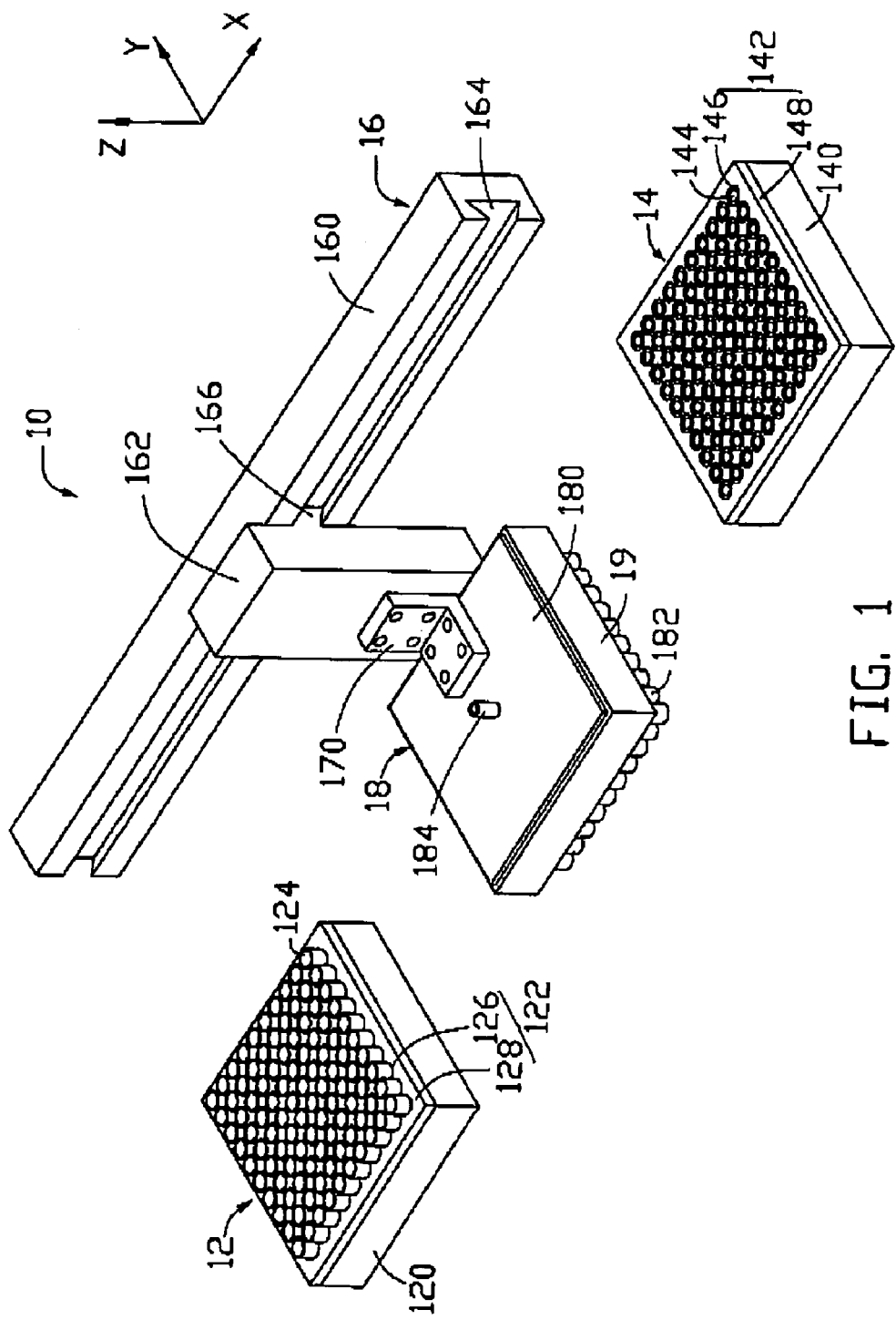
FIG. 1 is an isometric view of an apparatus for assembling a lens module in accordance with a present embodiment.
Figure 2:
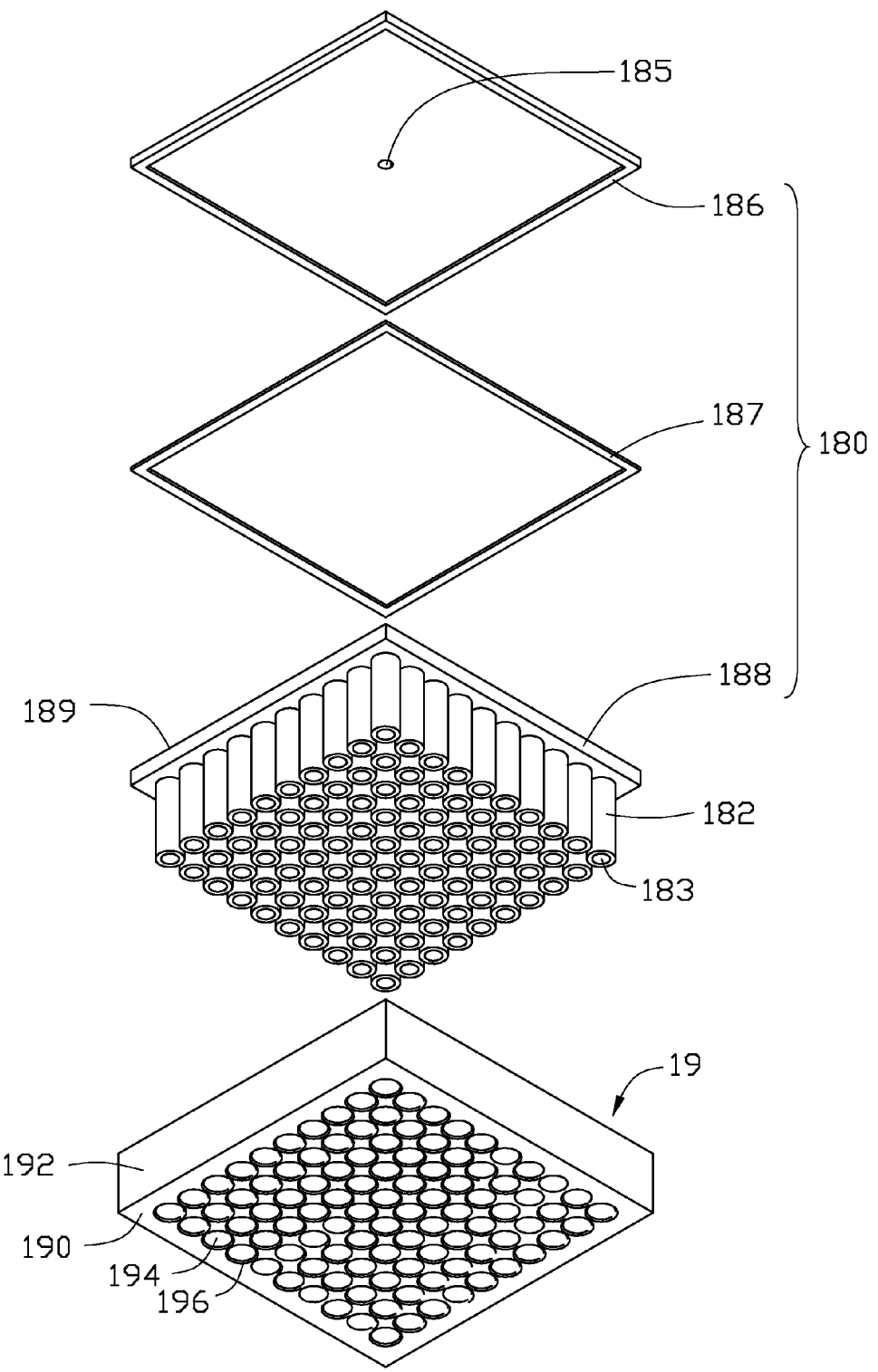
FIG. 2 is a schematic, exploded isometric view of an optical element pick-up device according to the present embodiment.
Figure 3:
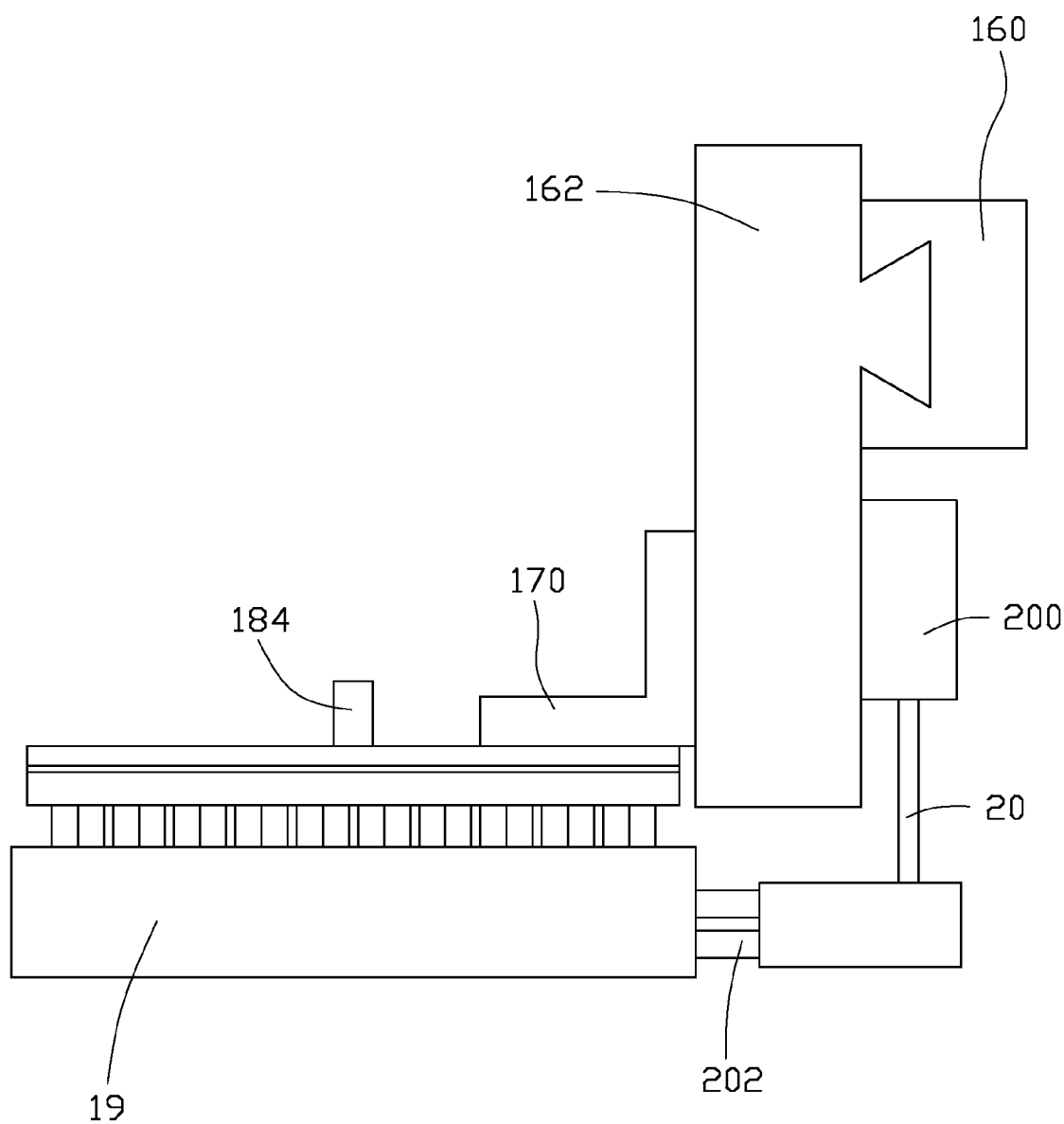
FIG. 3 is a schematic, side view of the optical element pick-up device and a robotic arm according to the present embodiment.

Referring to FIG. 1, an apparatus 10 for assembling lens module mainly includes a first table 12, a second table 14, a robotic arm 16, and an optical element pick-up device 18.

The first table 12 is configured for supporting the barrels 124 thereon. The first table 12 includes a first support 120 and a barrel tray 122. The barrel tray 122 is set on the first support 120. The barrel tray 122 includes a panel 128 with a plurality of receptacles 126 arranged in an m by n (m×n) array equally spaced with each other. The panel 128 may be made of metals with the receptacles 126 defined thereon. In alternative embodiments, barrel tray 122 can be made of polymers. In the present embodiment, each of the receptacles 126 is substantially cylinder shaped. In operation, a plurality of barrels 124 is accommodated in the receptacles 126.

The second table 14 is configured for supporting the optical elements 144 thereon, such as lenses, spacers, or filters. In the present embodiment, the optical elements 144 are lenses. The second table 14 includes a second support 140 and a lens tray 142. The lens tray 142 is set on the second support 140. The lens tray 142 includes a panel 148 with a plurality of receptacles 146 arranged in an m by n (m×n) array equally spaced with each other. In the present embodiment, each of the receptacles 146 is substantially cylinder shaped. In operation, a plurality of lenses is accommodated in the receptacles 146.

The robotic arm 16 is configured for picking up lenses 144 from the lens tray 142, and assembling the lenses 144 into the barrels 124. The robotic arm 16 includes a cross-beam 160 which can make vertical and horizontal movements. The robotic arm 16 further includes a longitudinal beam 162 engaged with the cross-beam 160 by a sliding slot 164 in the cross-beam 160 and a block 166 in the longitudinal beam 162. The sliding slot 164 is defined in a surface of the cross-beam 160. The sliding slot 164 extends along the extending direction of the cross-beam 160. The block 166 protrudes outwardly from one end of the longitudinal beam 162. The block 166 is engaged in the sliding slot 164 allowing the longitudinal beam 162 to slide relative to the cross-beam 160 along the extending direction. The optical element pick-up device 18 is secured on the other end of the longitudinal beam 162.

The optical element pick-up device 18 includes a main body 180, a plurality of suckers 182, and an air pipe 184. The main body 180, which is preferably configured as a hollow cubic, includes a first cover plate 186, a plastic sealing ring 187, and a second cover plate 188. The second cover plate 188 includes a flange portion 189 at the edges thereof. The sealing ring 187 is disposed between the first cover plate 186 and the second cover plate 188. The first cover plate 186, the sealing ring 187, and the second cover plate 188 can be fixed together by using an adhesive.

The plurality of suckers 182 is arranged on the outer surface of the second cover plate 188 in an m by n array corresponding to the receptacles 126, 146. The plurality of suckers 182 are equally spaced from each other. In the present embodiment, the plurality of suckers 182 is substantially cylinder shaped. Each of the suckers 182 has two ends opposite to each other. One end of the sucker 182 communicates with the cavity defined by the first cover plate 186, the sealing ring 187 and the second cover plate 188. The other end of the sucker 182 includes a suction mouth 183. It is understood that the plurality of suckers 182 can be integrally formed with the second cover plate 188.

The air pipe 184 communicates with the cavity defined by the first cover plate 186, the sealing ring 187 and the second cover plate 188 through a through hole 185 opened on the first cover plate 186. The air pipe 184 is always connected to a vacuum pump configured for providing a pressure below atmospheric pressure in the main body 180, so that the optical elements can be captured by the suction mouths 183.

In the present embodiment, the main body 180 is secured on the longitudinal beam 162 by an L iron 170. In operation, the main body 180 is set parallel with the first table 12 and the second table 14. The plurality of suckers 182 is perpendicular to the first table 12 and the second table 14.

The apparatus 10 further includes a guiding plate 19. The guiding plate 19 includes a plane substrate 190. In the present embodiment, the substrate 190 is square shaped. The guiding plate 19 in the present embodiment further includes four side plates 192 which are attached to the four edges of the plane substrate 190. The side plates 192 are perpendicular to the plane substrate 190. The guiding plate 19 is shaped like a short, wide, topless box. A plurality of through holes 194 is defined in the substrate 190. The through holes 194 are arranged corresponding to the suckers 182 in an m by n array equally spaced with each other. In the present embodiment, each of the through holes 194 includes a beveled edge 196. The beveled edge 196 slants from (but instead often at 45 degrees) the faces of the substrate 190. The plurality of suckers 182 is inserted into the plurality of through holes 194. The main body 180 is coiled around the side plates 192.

The apparatus 10 further includes a driver element 200. In the present embodiment, the driver element 200 is an air cylinder. The air cylinder 200 includes a connecting rod 20 connected with the piston (not shown in the figures) inside the air cylinder 200. The air cylinder 200 is attached to the longitudinal beam 162. The connecting rod 20 is secured with the side plate 192 by screws 202. The connecting rod 20 is configured for driving the guiding plate 19 to move relative to the main body 180 linearly in a Z-axis direction, as illustrated in FIG. 1. In alternative embodiments, the driver element 200 can be a step motor or other cylinder.

Figure 4:
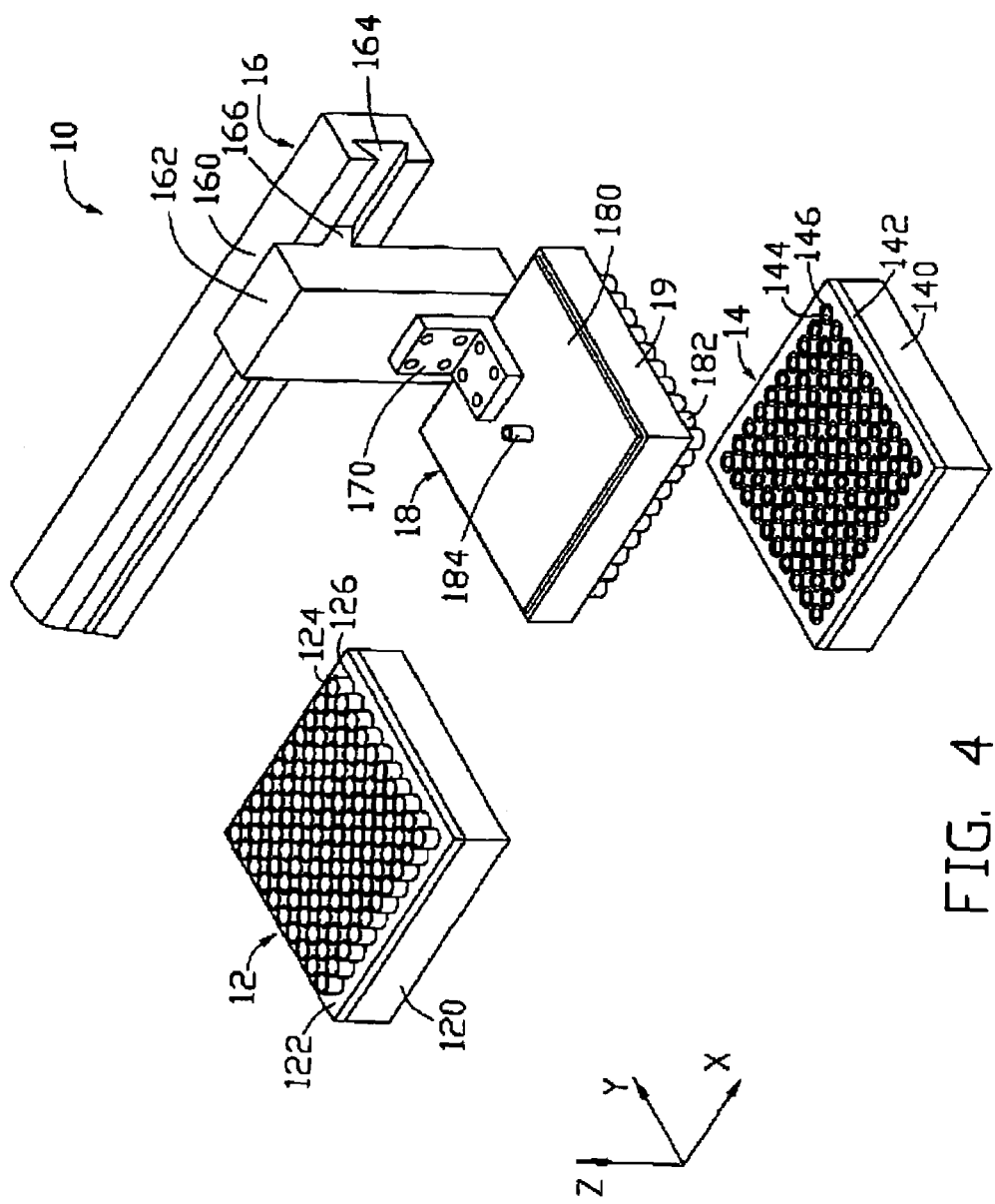
FIGS. 4 to 6 are schematic, isometric views of the apparatus of FIG. 1 in different positions.
Figure 5:
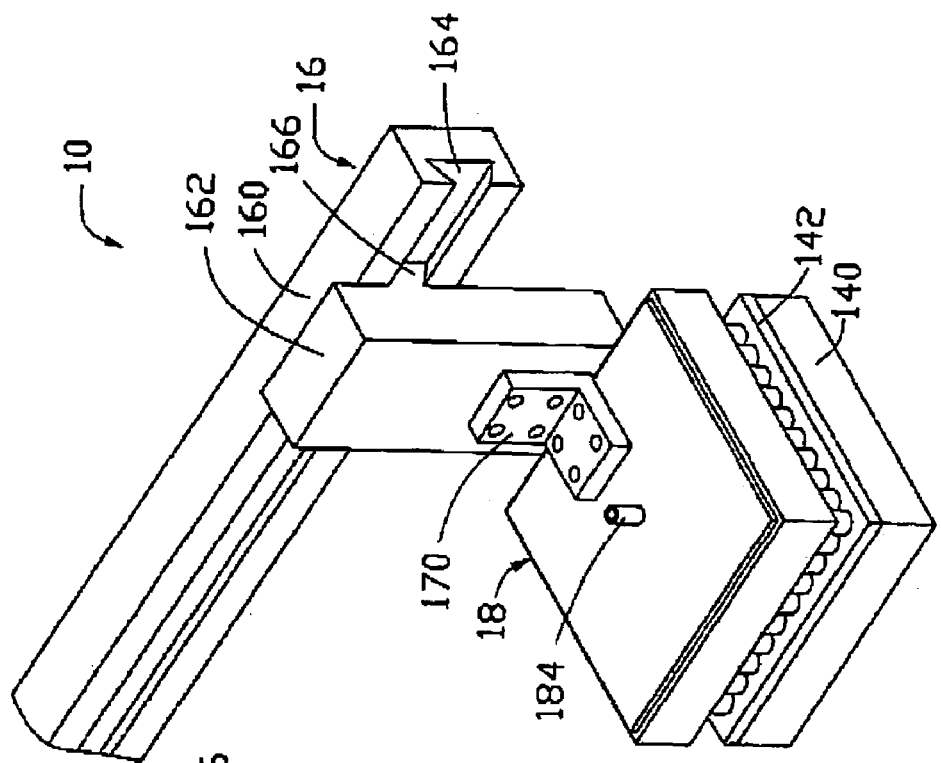
Figure 5:
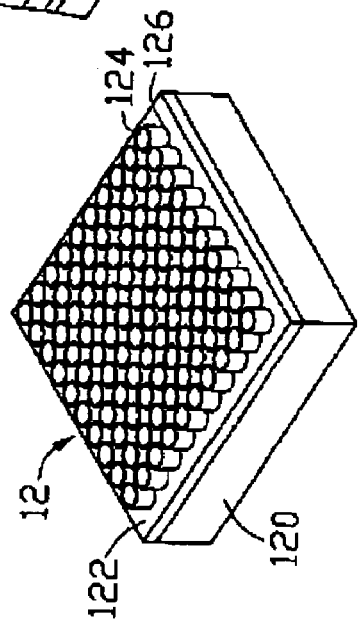
Figure 6:
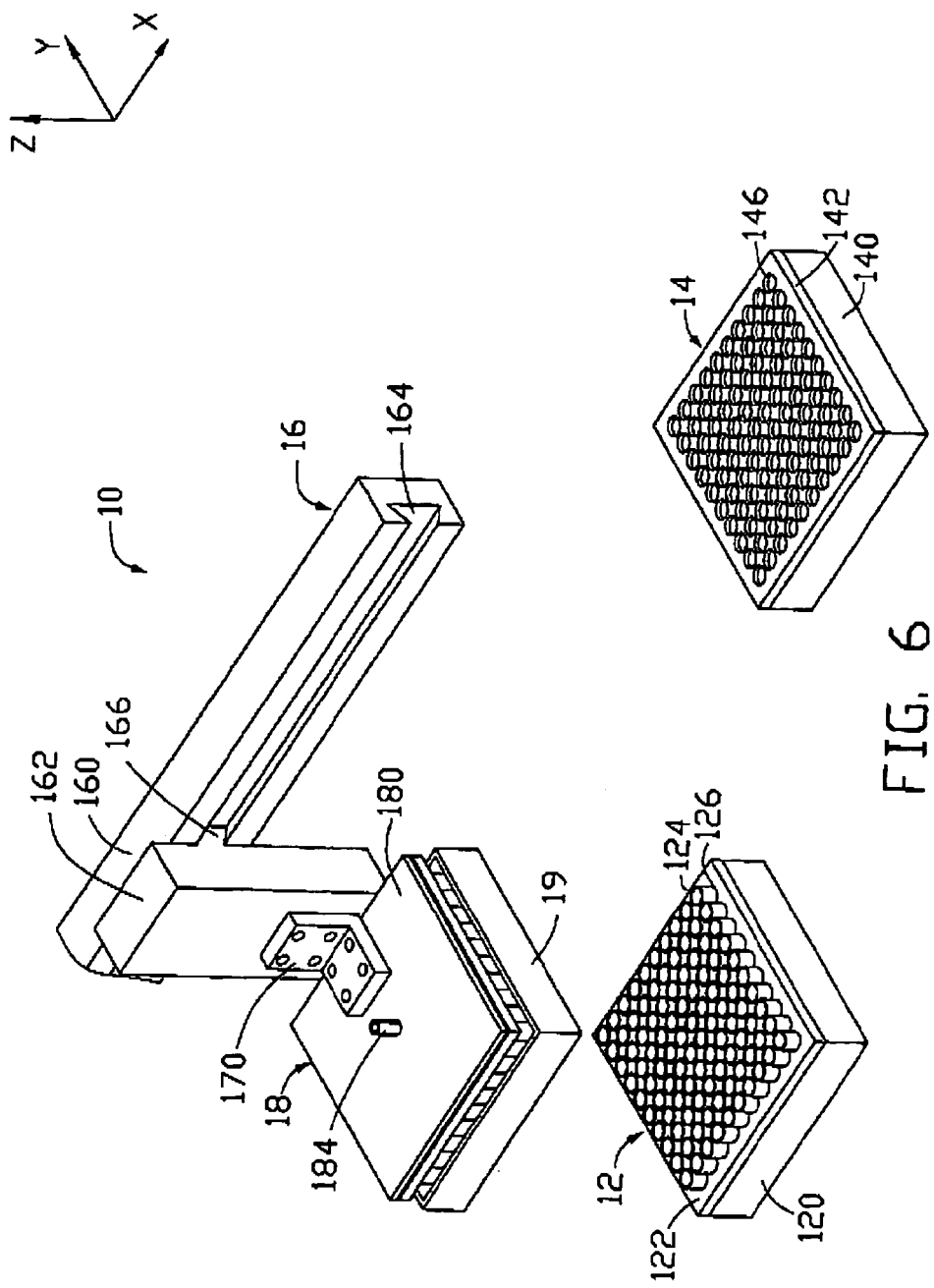
Figure 7:
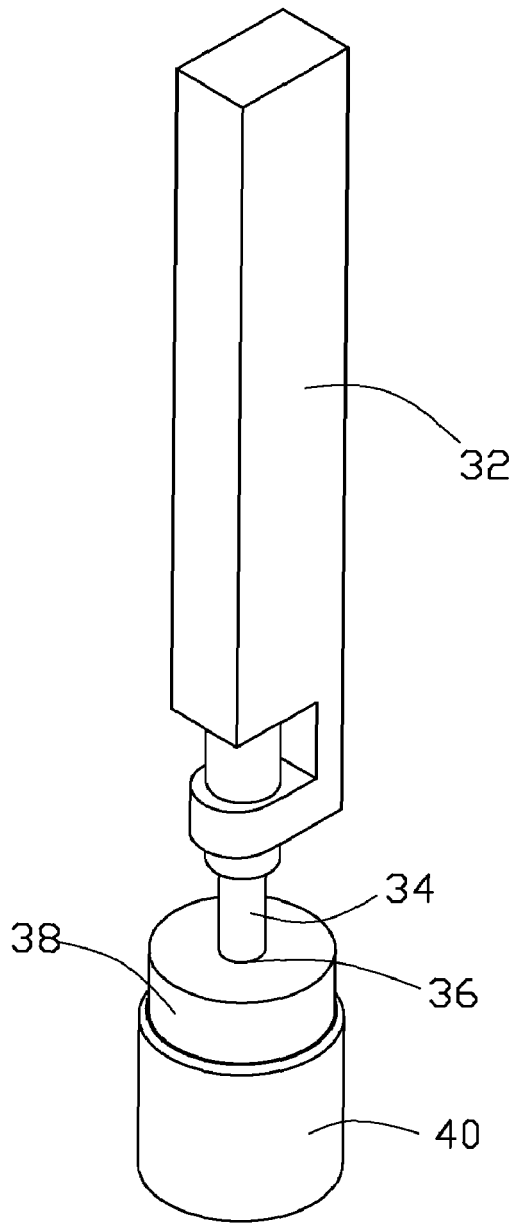
FIG. 7 is a schematic, isometric view of a typical apparatus for assembling lens module.

In operation, referring to FIGS. 4 to 6, a process of a method for assembling lens modules are illustrated.

In step 1, a plurality of barrels 124 is accommodated in the receptacles 126 of the barrel tray 122, and a plurality of lenses 144 are received in the receptacles 146 of the lens tray 142. The first table 12 and the second table 14 are arranged in a line along an X-axis, as illustrated in FIG. 1.

In step 2, referring to FIG. 4, the position of the optical element pick-up device 18 is adjusted by the robotic arm 16, so that the pick-up device 18 is positioned right above the second table 14. The plurality of suction mouths 183 are facing to the lenses 144.

In step 3, referring to FIGS. 4 and 5, the robotic arm 16 moves toward the second table 14, the plurality of lenses 144 are sucked by the suction mouths 183, and then the robotic arm 16 goes up and moves in a direction along the X-axis.

In step 4, referring to FIG. 6, the guiding plate 19 is driven by the air cylinder 200 to move downward relative to the optical element main body 180. During the process, the lenses 144 are guided by the beveled edge 196, whereby the geometry center of each of the lens 144 is on the center axis of the corresponding sucker 182. After that, the guiding plate 19 moves upward relative to the main body 180. This step can also be accomplished before step 3.

In step 5, the robotic arm 16 moves toward the first table 12, the lenses 144 are inserted into the barrels 124 by the suckers 182, and then the lenses 144 are released by the suckers 182.

In step 6, the robotic arm 16 goes up and moves in the direction of the X-axis to the position right above the second table 14.

The steps 1 to 6 can be repeated to assemble different optical elements into the barrel.

Compared with the conventional apparatus for assembling lens modules, the apparatus 10 can significantly reduce cost upon a condition where a large number of lens modules are being assembled.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. An apparatus for assembling a lens module, comprising:
a first tray configured for supporting a plurality of barrels thereon,
a second tray configured for supporting a plurality of optical elements thereon, and
a movable robotic arm having an optical element pick-up device; the optical element pick-up device comprising a plurality of suction mouths configured for simultaneously picking up all the optical elements from the second tray and simultaneously placing the optical elements into the respective barrels.

2. The apparatus as described in claim 1, wherein the optical element pick-up device comprises a main body, a plurality of suckers, and an air pipe; the main body defining a sealed cavity, each of the suckers comprising a first end and a suction mouth at a second end opposite to the first end, the first end of the sucker and the air pipe in communication with the sealed cavity, and a pump connected with the air pipe for providing a pressure below atmospheric pressure in the sealed cavity.

3. The apparatus as described in claim 2, further comprising a guiding plate, wherein the guiding plate comprises a plurality of through holes spatially corresponding to the suckers, the suckers being inserted into the respective through holes.

4. The apparatus as described in claim 3, wherein the guiding plate includes an inner sidewall surface in each of the through holes, the inner sidewall surface being obliquely oriented relative to a main plane of the guiding plate.

5. The apparatus as described in claim 3, wherein the main body is cubic shaped.

6. The apparatus as described in claim 3, wherein the main body includes a first cover plate, a plastic sealing ring, and a second cover plate; the sealing ring being disposed between the first cover plate and the second cover plate; and the first cover plate, the sealing ring, and the second cover plate being fixed together and cooperating to form the sealed cavity.

7. The apparatus as described in claim 2, wherein each of the plurality of suckers is cylinder shaped.

8. The apparatus as described in claim 2, wherein the plurality of suckers is integrally formed with the main body.

9. The apparatus as described in claim 1, wherein the first tray comprises a plurality of receptacles arranged in rows and columns for receiving the barrels.

10. The apparatus as described in claim 9, wherein the second tray comprises a plurality of receptacles arranged in rows and columns for receiving the optical elements.

11. The apparatus as described in claim 10, wherein the plurality of suction mouths is arranged in rows and columns spatially corresponding to the receptacles in the first tray and the second tray.

* * * * *